(12) United States Patent
Case et al.

(10) Patent No.: US 7,861,085 B1
(45) Date of Patent: Dec. 28, 2010

(54) SYSTEMS AND METHODS PROVIDING DISTRIBUTED MANAGEMENT OF ELECTRONIC SIGNATURES IN INDUSTRIAL AUTOMATION SYSTEMS

(75) Inventors: Clark Case, Phoenix, AZ (US); Robert C. Kline, Jr., Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1296 days.

(21) Appl. No.: 10/952,984

(22) Filed: Sep. 29, 2004

(51) Int. Cl.
*G06F 7/04* (2006.01)
*H04L 9/32* (2006.01)

(52) U.S. Cl. ......................... 713/176; 726/26

(58) Field of Classification Search ................. None
See application file for complete search history.

(56) References Cited

U.S. PATENT DOCUMENTS

| | | | |
|---|---|---|---|
| 5,367,624 A * | 11/1994 | Cooper ....................... 715/734 |
| 6,581,020 B1 | 6/2003 | Buote et al. |
| 6,681,198 B2 | 1/2004 | Buote et al. |
| 7,092,839 B2 * | 8/2006 | Buote et al. ................. 702/123 |
| 7,380,213 B2 * | 5/2008 | Pokorny et al. ............. 715/764 |
| 7,483,546 B2 * | 1/2009 | Bar et al. ..................... 382/100 |
| 2003/0009672 A1 * | 1/2003 | Goodman ................... 713/176 |
| 2003/0069894 A1 * | 4/2003 | Cotter et al. ............. 707/104.1 |
| 2003/0131241 A1 * | 7/2003 | Gladney ..................... 713/176 |
| 2004/0064253 A1 * | 4/2004 | Brayton et al. ................. 702/2 |
| 2004/0093526 A1 * | 5/2004 | Hirsch ....................... 713/202 |
| 2004/0117624 A1 * | 6/2004 | Brandt et al. ............... 713/166 |
| 2004/0158475 A1 * | 8/2004 | Juzeszyn et al. ................ 705/1 |
| 2005/0108536 A1 * | 5/2005 | Karimisetty et al. ........ 713/176 |
| 2005/0108537 A1 * | 5/2005 | Puri et al. ................... 713/176 |
| 2007/0198213 A1 * | 8/2007 | Parvin et al. ................ 702/179 |

OTHER PUBLICATIONS

USPTO Patent Application 20040117624, file date Sep. 12, 2003, David Brandt et al.
Sasha V. Ilyukhin, Timothy A. Haley, and John W. Larkin, Control System Validation: Key to Automated Food Processing, FoodTechnology, Mar. 2000, vol. 54, No. 3, pp. 66-72.
David Deitz, Addressing 21 CFR Part 11 Requirements with an Automated Configuration Audit Trail and Version Management System, The Official Journal of ISPE, Mar./Apr. 2001, vol. 21, No. 2.

* cited by examiner

*Primary Examiner*—Michael Pyzocha
*Assistant Examiner*—Jeffery Williams
(74) *Attorney, Agent, or Firm*—Turocy & Watson LLP; William R. Walbrun; John M. Miller (57) ABSTRACT

The subject invention relates to a system and methodology facilitating automated manufacturing processes in a regulated industrial controller environment, wherein a centralized signature component generates signature events to remote locations and validates signatures required to satisfy such events. A system for distributed signature processing is provided. The system includes a signature component to determine when to generate one or more electronic signature events and to validate electronic signatures that have been received from various local or remote locations. An application layer distributes interface components to the locations in order to facilitate generation of the electronic signature events and validation of the electronic signatures.

21 Claims, 12 Drawing Sheets

SYSTEMS AND METHODS PROVIDING DISTRIBUTED MANAGEMENT OF ELECTRONIC SIGNATURES IN INDUSTRIAL AUTOMATION SYSTEMS

TECHNICAL FIELD

The subject invention relates generally to industrial control systems, and more particularly to a system and methodology that enables industrial automation equipment to be regulated according to applicable standards via the employment of electronic signatures that are managed in a distributed application architecture.

BACKGROUND OF THE INVENTION

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

In modern systems, many layers of regulation are now being imposed on automated industries to ensure compliance to applicable standards. To document that these requirements are being adhered to, often one or more signatures are required which in some systems may not be more than merely signing a journal record or document but, in increasing circumstances these procedures have become electronic. For instance, if a customer in an FDA regulated industry desires to use electronic signatures in place of handwritten signatures, they must do so in accordance with 21 CFR Part 11. In some existing systems, electronic signatures are only offered in association with report parameter verification in procedural phases, verification of procedural steps, and confirmation of batch and phase commands. However, these signatures may be lacking several key features required under 21 CFR Part 11. For example, the meanings of the signatures are not presented to the signers nor recorded, and in some electronic event journals it may be difficult or impossible to determine if an electronic signature was properly obtained or not.

Some of the notable aspects of 21 CFR Part 11 include:
(a) Signed electronic records shall contain information associated with the signing that clearly indicates all of the following:
  (1) The printed name of the signer;
  (2) The date and time when the signature was executed; and
  (3) The meaning (such as review, approval, responsibility, or authorship) associated with the signature.
(b) The items identified in paragraphs (a)(1), (a)(2), and (a)(3) of this section shall be subject to the same controls as for electronic records and shall be included as part of any human readable form of the electronic record (such as electronic display or printout).

In addition to the components mentioned above, customer requirements include the ability to specify one or more signers for each signature, to specify security requirements for each signer, and to specify a comment requirement for each signer.

Journaling requirements are further described in the following 21 CFR Part 11 excerpt:

"Electronic signatures and handwritten signatures executed to electronic records shall be linked to their respective electronic records to ensure that the signatures cannot be excised, copied, or otherwise transferred to falsify and electronic record by ordinary means."

In view of the above, many modern industrial automation systems are not equipped to process, record, and document required signature activities. For instance, in a typical factory setting, process steps and operator actions requiring possible signature authentication are highly distributed throughout various locations in the factories. Attempting to manage such activities from various locations can be a challenge even for the most sophisticated of automation systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and methodology to automatically manage and control electronic signature activities in accordance with a distributed industrial control system. In one aspect, the system provides distributed management of electronic signatures for manual data entry and operator actions that includes an automated, distributable mechanism for the collection of validatable signatures for confirmation of operator actions and/or for acknowledgement of process conditions or deviations. Signatures can be generated by operator commands, automated phase logic uploading values outside of defined ranges, operators entering values outside of defined ranges, and so forth. After signatures are generated, they are managed, centrally, with distributed client applications sending in user ID and password data to be validated, for example. By providing a centralized architecture to control when signatures are required and to collect and validate signatures from remote locations in an industrial environment, the subject invention provides a controlled, flexible, and scalable environment to manage regulatory requirements for automated processes while seamlessly distributing intelligence for such control to a plurality of local or remote interface locations that interact with factory automation systems.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention relates to a system and methodology facilitating automated manufacturing processes in a regulated industrial controller environment, wherein a centralized signature component generates signature events to remote locations and validates signatures required to satisfy such events. In one aspect, a system for distributed signature processing is provided. The system includes a signature component to determine when to generate one or more electronic signature events and also to validate electronic signatures that have been received from various remote locations that respond to such events in order to comply with regulatory requirements of an automated industrial process. An application layer distributes interface components to the remote locations in order to facilitate generation of the electronic signature events and validation of the electronic signatures. A centralized processor such as a batch server can operate the signature component to generate the electronic signature events and to validate the signatures.

It is noted that as used in this application, terms such as "component," "layer," "object," "class," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
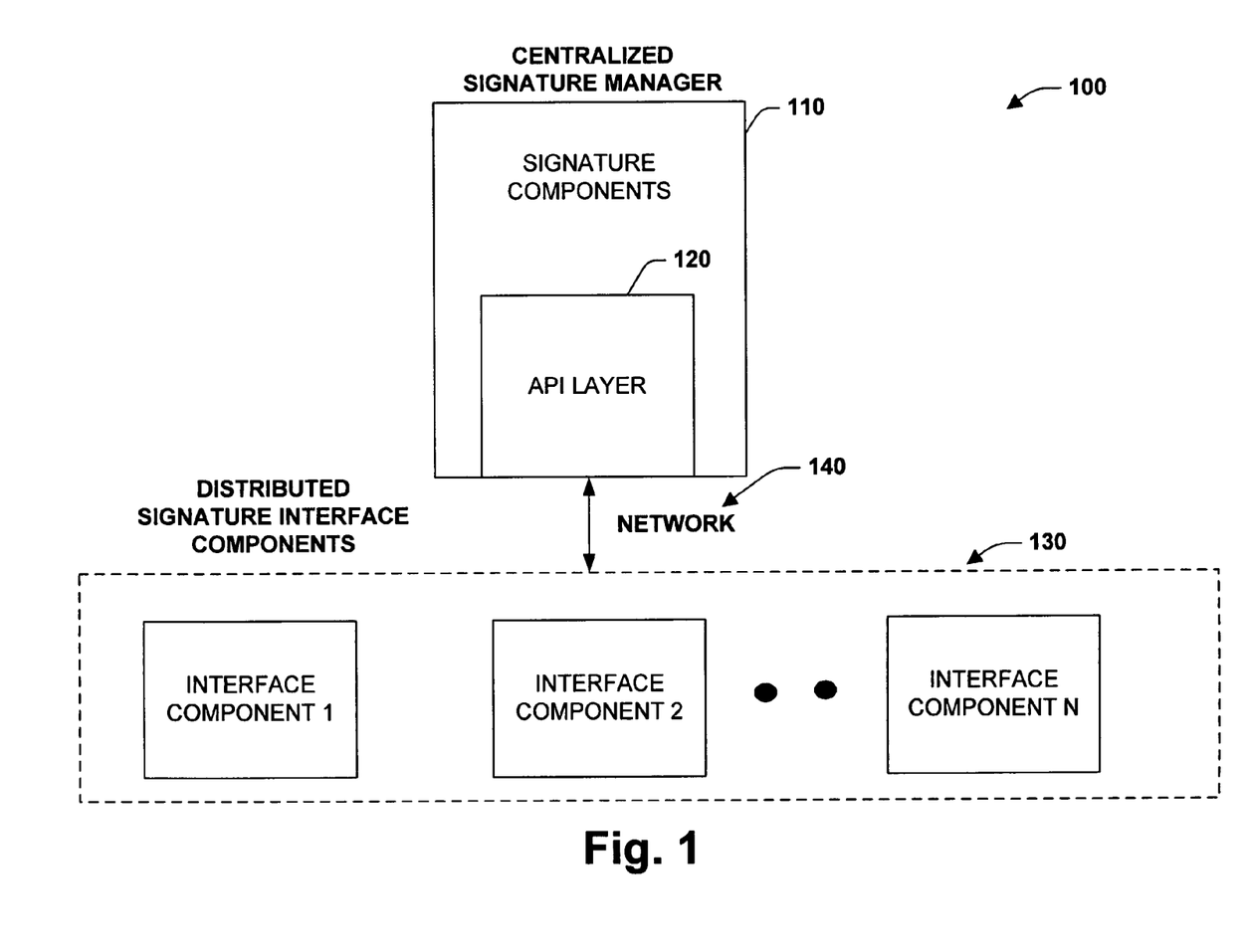
FIG. 1 is a schematic block diagram illustrates a distributed signature processing system in accordance with an aspect of the subject invention.

Referring initially to FIG. 1, a system 100 illustrates distributed signature processing in accordance with an aspect of the subject invention. A signature component 110 is associated with an Application Programming Interface (API) layer 120 that is employed to facilitate generation, control, and management of electronic signatures (not shown). These signatures are electronic versions of actual signatures that become associated with electronic documentation that verifies whether a system is in compliance with applicable regulations. For instance, if a process step executes, a manual phase may be initiated whereby a user enters a respective value to document the procedure which is then authenticated by entering a user name or password in one example that satisfies the signature requirement. In other cases, signatures can be generated by operator commands, automated phase logic uploading values outside of defined ranges, operators entering values outside of defined ranges, or with respect to other automated requirements of an automated process. After signatures are generated, they are managed centrally via the signature components 110, with distributed client applications interacting with the signature components through the API layer 120.

In general, the signature components 110 determines when a signature event or requirement is to be executed and then proceeds to automatically verify whether or not the requirement for signature has been met. The API layer 120 is employed to facilitate notifying one or more interface components 130 of a signature requirement and then interacting with the interface components to complete and verify the requested signature. The interface components 130 operating on computers can locally interface with the signature components 110 or more likely interface over remote connections via a network 140 that can include local factory networks or global networks such as the Internet, wherein wired or wireless connections are available.

The API layer 120 can include various components such as schemas, interface templates, dialog options, signature controls, inputs for receiving signatures, Active X controls, display outputs to drive various signature procedures and various graphical user interfaces components. The API layer 120 enables signatures to be managed and controlled from a centralized location such as a batch server yet, still allow great flexibility when interfacing to the server. This includes distributing components to trigger a signature event at remote locations while receiving signature data verifying the events from such locations.

Figure 2:
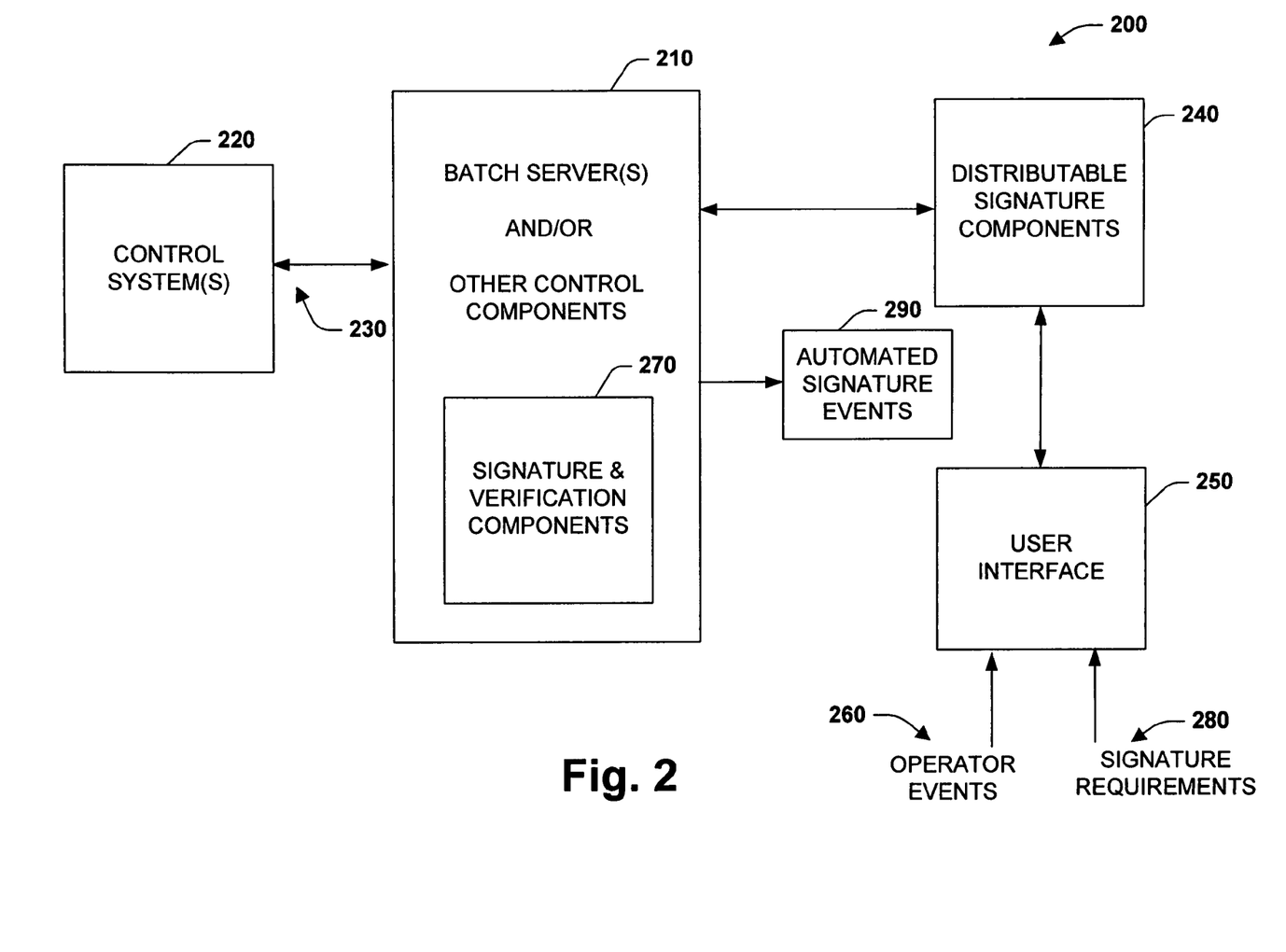
FIG. 2 illustrates a batch system for signature processing in accordance with an aspect of the subject invention.

Other features provided by the distributed architecture depicted by the system 100 include linking signature records to the events to which they correlate. Also, signatures can be triggered by phase logic, a Batch Server or processor, or by a user. Generally, a signature can include one or more signoffs, wherein each signoff may include a user ID and password field (or other data supplied by operator). For each signoff, a comment field can be required, optional, or not allowed. The signoffs can have an associated meaning and associated security requirements which are described below.

A signature and its component parts can be configurable for any operator interaction with a running batch. However, signatures initiated by a process-connected device cannot be canceled, whereas signatures initiated by an operator interaction can be canceled. In one aspect, signatures can be considered transactions—until the transactions are completed the actions they correlate to are not performed. Thus, signatures can be held active until they are completed, or, in some cases, canceled. Interactions with signatures, successful or not, are journaled (e.g., stored in an event file). Also, if a signature requires multiple signoffs, each signoff can be completed on different workstations. Before proceeding with a discussion of FIG. 2, the following definitions may be employed:

Electronic Signature

An electronic representation of a signature, including associated data. Can include one or two signoffs—or more. Associated data includes meanings for the signoffs, comments, security requirements, and timestamps.

Signoff

A component of an electronic signature in which a user enters his username and password and optionally a comment. An electronic signature can require one or two signoffs or more.

Signoff Meaning

A short phrase describing the meaning attached to a given signoff. For example, "Done By" or "Checked By".

Signature List

A list of pending signatures and their related commands, report parameters, etc. maintained on a Batch Server or processor.

Signature List UI

User interface for accessing all types of signatures not associated with eProcedure phases.

Signature Template

A collection of data to define a signature—number of signoffs, signoff meanings, signoff security requirements, and signoff comment requirements. Signature templates can be defined centrally, and can be referred to when defining signature requirements.

Cancel a Signature

When a user cancels a signature, this signals the batch system that the signature will not be completed. The Batch system will then let the originator of the signature know that it has been canceled so that it may take appropriate actions. Likely reasons for canceling a signature include incorrect data associated with the signature and the user desiring to prevent a command associated with a signature to complete.

Referring now to FIG. 2, a system 200 illustrates signature processing via a batch server in accordance with an aspect of the subject invention. The system 200 includes a batch server 210 for processing recipes or programs that are employed to manufacture a plurality of differing products in an automated industrial environment. The server 210 generally operates with one or more control systems 220 via network connections 230 (wireless and/or wired) to the server 210. Such network connections can include local factory networks such as ControlNet, DeviceNet or Ethernet and can include communications to remote systems such as over the Internet, for example. The control systems 220 can include programmable logic controllers, I/O modules, communications modules and so forth. In order to facilitate signature processing, one or more distributable signature components 240 are migrated to various locations across the factory. These components can include signature templates, Application Programming Interfaces (APIs), Schemas, and so forth that drive respective user interface components 250 to interact with various users or operators associated with the control systems 220 and/or batch server 210. The user interface 250 interacts with operators to control a process and manage signatures in accordance with the subject invention.

At 260, one or more operator actions can be input that may affect operations of the system 200. For instance, an operator may request to change a parameter or system variable. This request is fed back to the server 210, wherein a signature and verification component 270 determines whether or not the changed parameter requires signature verification for such request. These determinations can include policy or rule determinations and/or limit testing on the changed value. If the parameter change requires a signature, the batch server 210 initiates a signature verification procedure, wherein the operator (or operators) is required to perform one or more signature requirements 280 at the user interface 250. These requirements 280 can include such procedures as entering a user name and password, for example. After entering the signature data, the data is transferred to the server where the data is verified by the signature and verification component 270. When the data has been verified, automated processes occur such updating a regulation record with the operator's electronic signature. After verification, the actual parameter change can be initiated on the batch server 210 and/or control system 220. At 290, one or more automated signature events (non-operator initiated) can occur such as an event that is detected during a recipe phase or step that requires signature verification and validation before proceeding with other phases or steps. Upon triggering of the automated event 290, the user can be directed to complete a signature requirement at 280 via the user interface 250.

Figure 3:
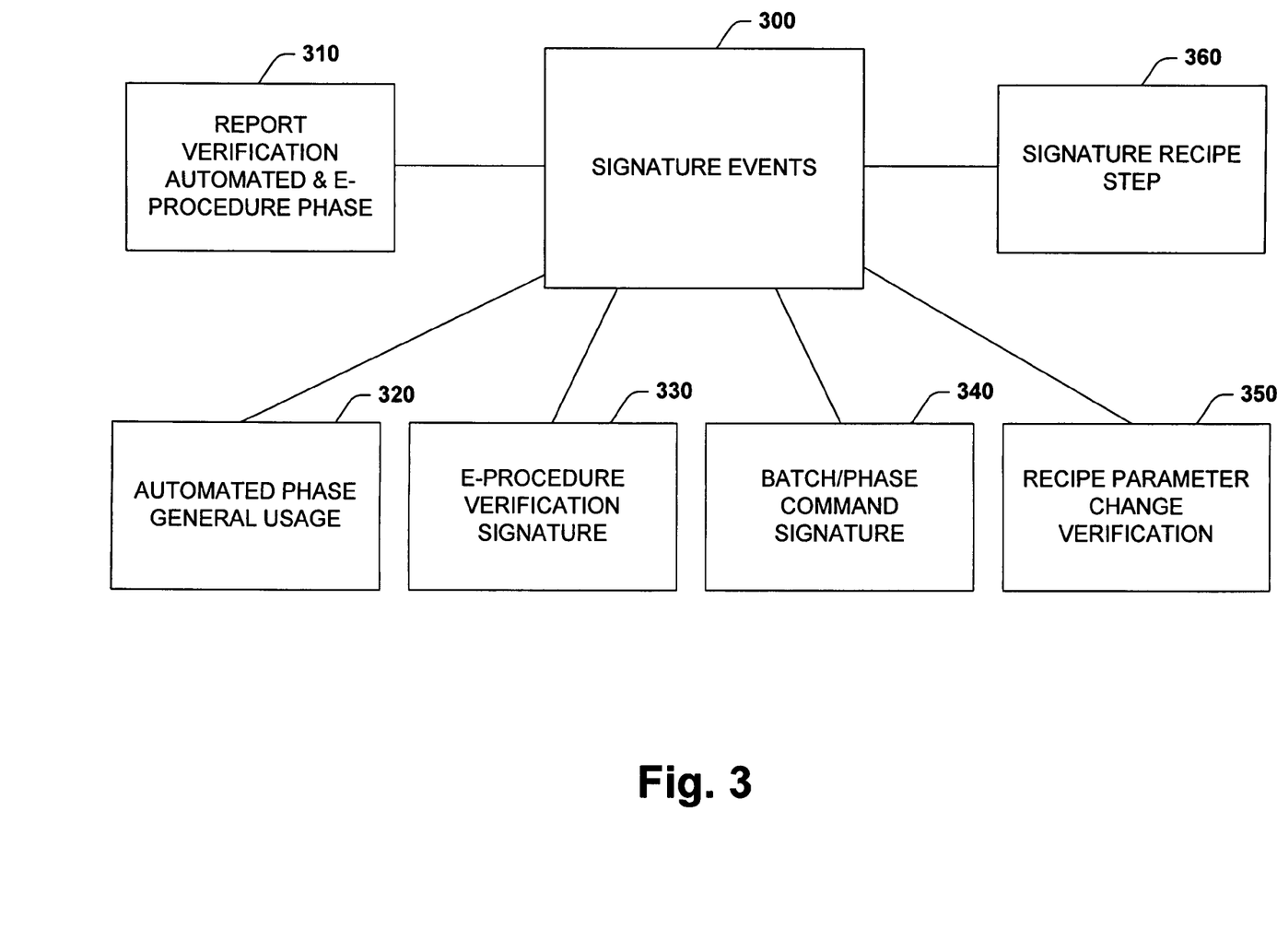
FIG. 3 illustrates example signature events in accordance with an aspect of the subject invention.

Referring to FIG. 3, various signature events 300 are illustrated in accordance with an aspect of the subject invention. The signature events describe conditions in which an electronic signature requirement can be generated by the system or an operator. At 310, one type of signature event is report verification for an automated phase or for a manual phase. This can include signature generated based on the report verification policy of a report in an automated phase or based on the report verification policy of a report in a manual phase. At 320, a signature event can be related to general usage requirements of an automated phase. In this case, the signature can be requested at any point during execution of the automated phase. At 330, signatures can be generated resulting from a manual phase step being completed.

At 340, signatures resulting from an operator issuing a batch or phase command from batch system user interface can be employed. These type signatures result from an operator initiating some type of activity. Such activities can include variable changes, program changes, process changes and so forth that affect how the system performs. Other actions can include commands such as start, hold, restart, abort, stop, reset, manual, pause, resume, acknowledge, and disconnect, for example. Still yet other commands can include auto, download, semi-auto, add batch, remove batch, step change, clear failures, acquire, release, and bind, for example. At 350, signatures can be generated that result from an operator changing the value of a recipe parameter from batch system user interface. At 360, signatures can be generated as a step in the execution of a recipe.

Figure 4:
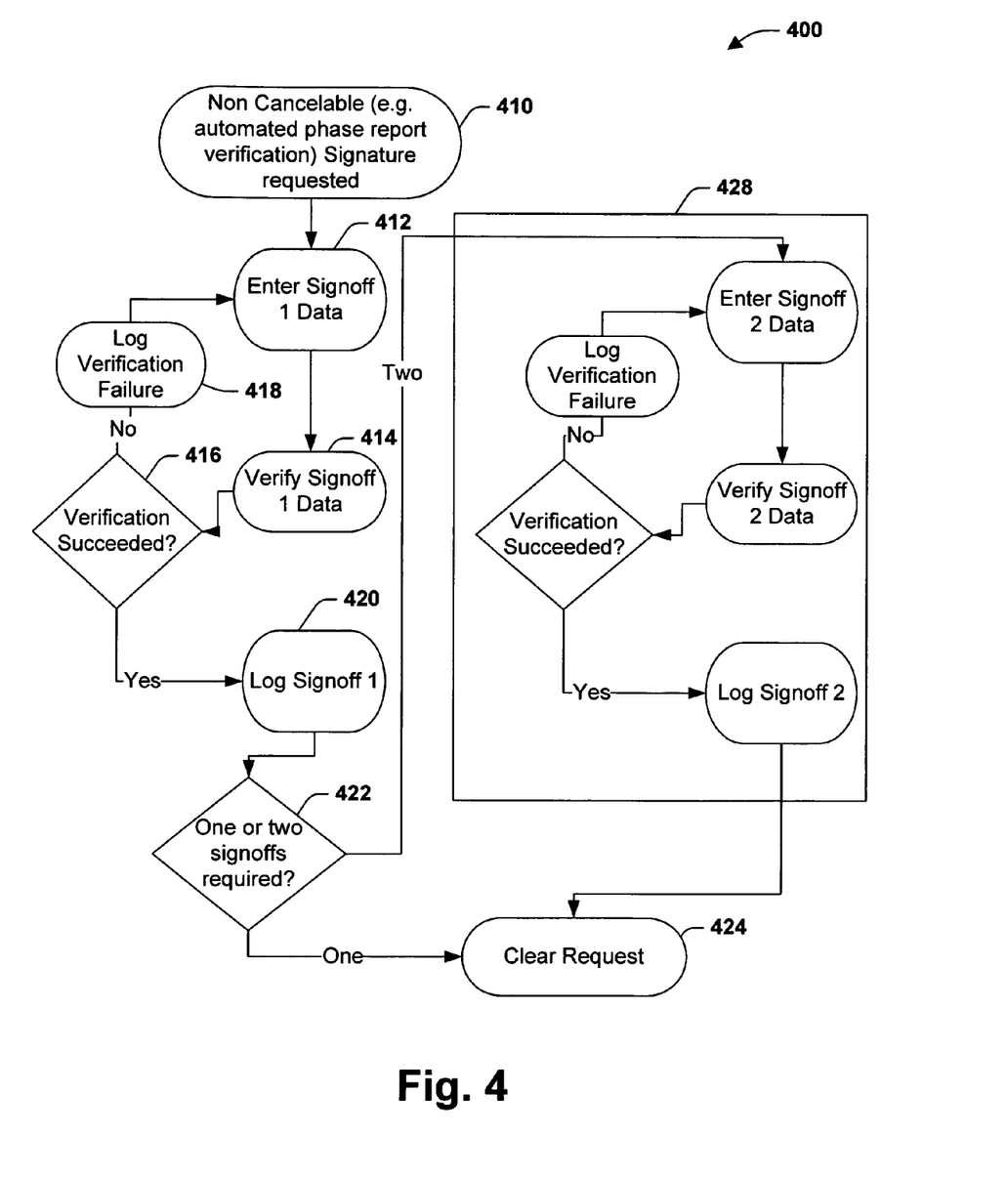
FIGS. 4-6 illustrate example signature processes in accordance with an aspect of the subject invention.
Figure 5:
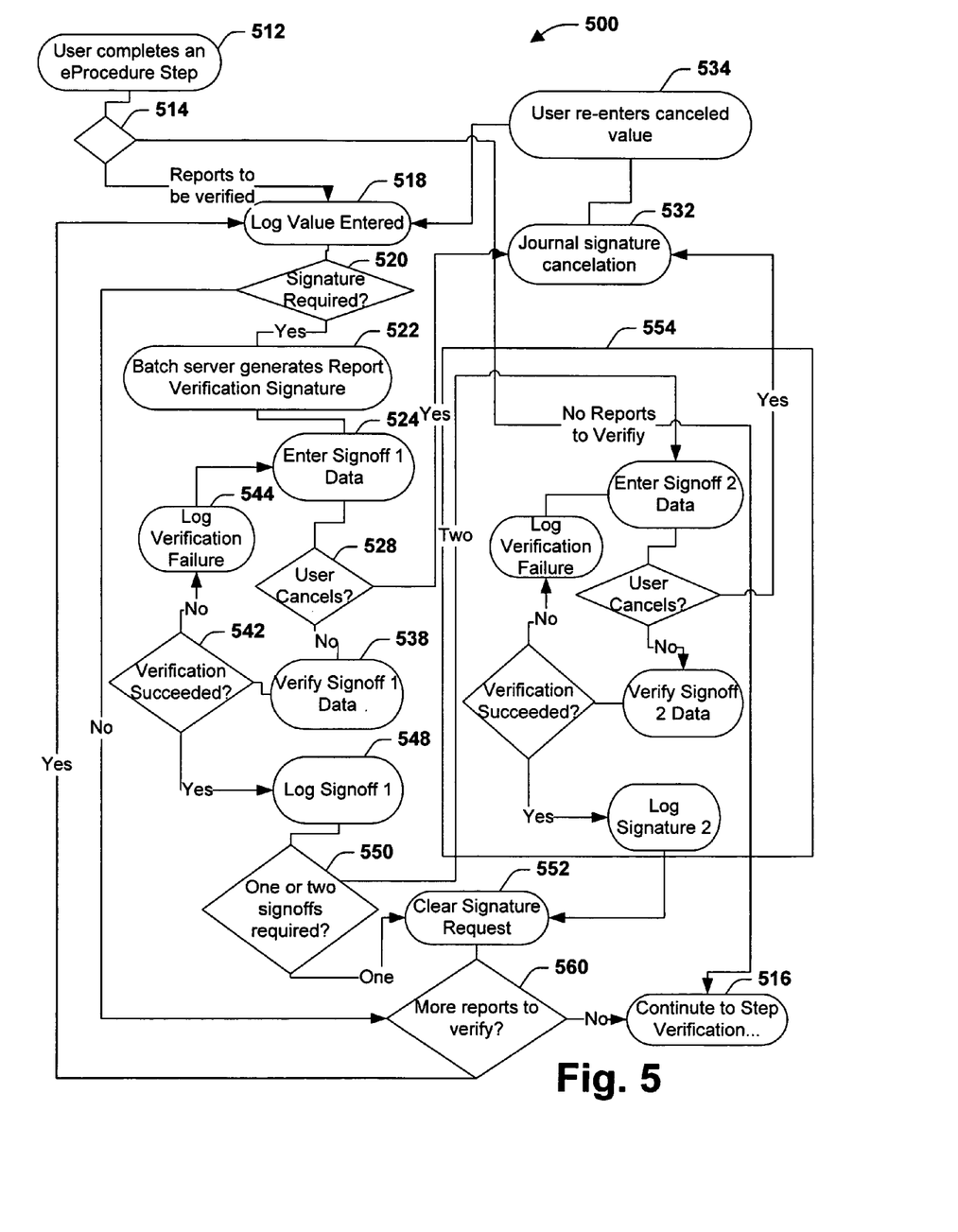
Figure 6:
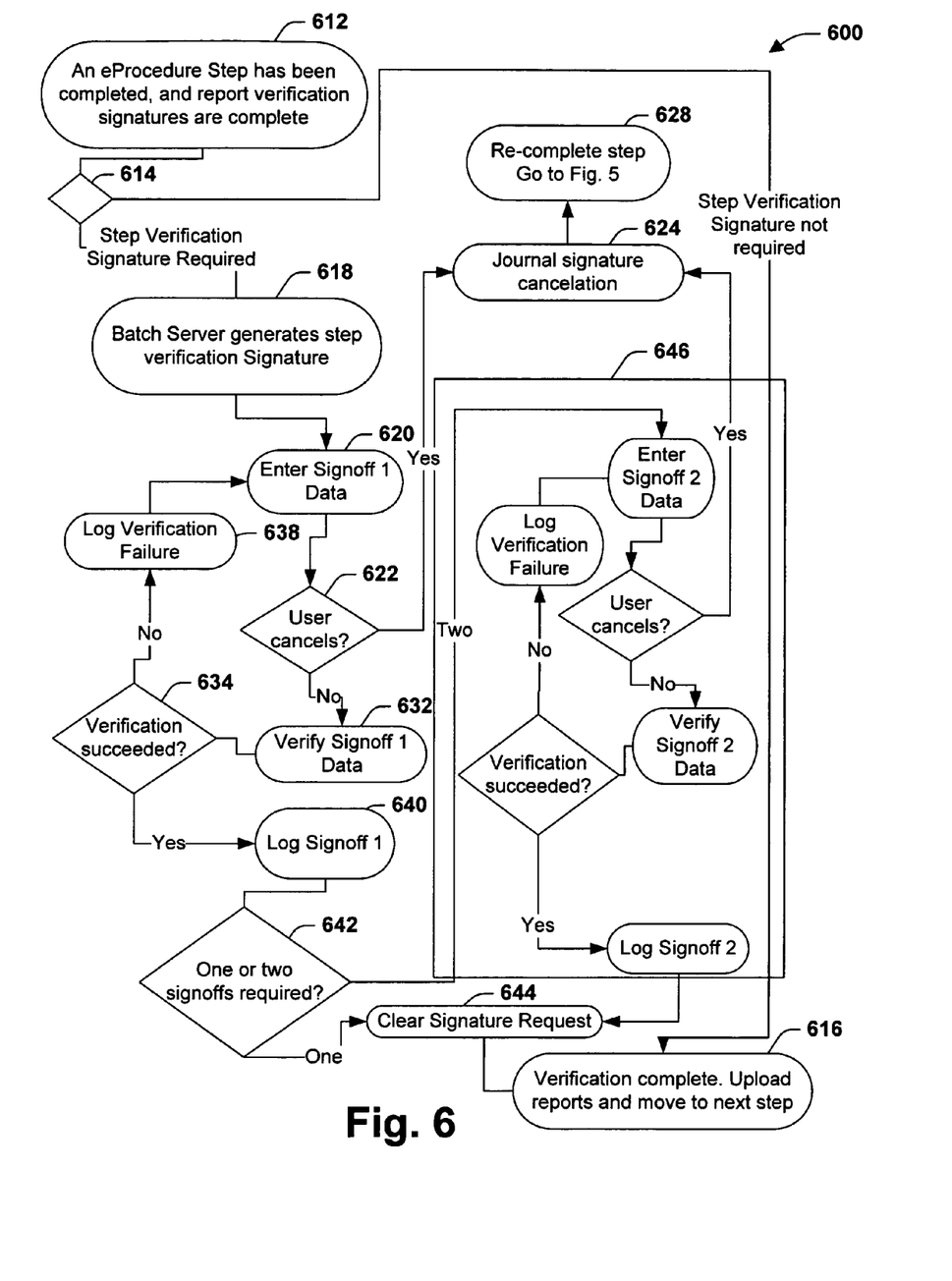

FIGS. 4-6 illustrate example processes 400, 500, and 600 for distributed signature processing in accordance with an aspect of the subject invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Referring to FIG. 4, a process 400 illustrates automated phase report verification and/or general usage signature processing in accordance with an aspect of the subject invention. These types of signature requirements generally originate from programmed phase logic and are thus not considered cancelable. At 410, a non-cancelable signature is requested such as a report verification request and/or a general usage signature. At 412, a signature data associated with a first user is entered. At 414, the signoff data entered at 412 is verified such as verifying that a password correlates to a valid username. At 416, a determination is made as to whether or not the verification succeeded. If not, the process logs a verification failure at 418 and proceeds back to receive new signoff data. If the verification is a success at 416, the process proceeds to 420 to log that a successful signoff has occurred. At 422, a determination is made as to whether another signoff is required. If not, the process proceeds to 424 and clears the request for the signature and logs successful completion of the signature. If another signoff is required, the process proceeds to the acts represented at 428 to request signature verification from a subsequent user. These acts are similar to the acts represented at 412-420. As can be appreciated, signoff for a given signature requirement can occur with more than two users.

Turning to FIG. 5, a process 500 illustrates a report verification signature in a manual phase in accordance with an aspect of the present invention. The process 500 describes signatures and related processing that result from an operator entering values in a manual phase with a corresponding acknowledgement (e.g., selecting an OK button on a user interface). After reports in a respective step have been verified, processing continues with step verification illustrated in FIG. 6.

Proceeding to 512, a user completes a step in a manual phase. At 514, if there are no reports to verify, the process proceeds to 516 to continue with step verification depicted in FIG. 6. If there are reports to verify at 514, the process proceeds to 518, where values that are entered for the report are logged. At 520, a determination is made as to whether or not a signature is required. If so, the process proceeds to 522 where a batch server generates a report verification signature. At 524, a user enters signoff data for the verification. At 528, a determination is made as to whether or not a user desires to cancel the verification. If so, the process proceeds to 532 where the signature cancellation is logged. Then, at 534, upon cancellation, the user re-enters the cancelled value, wherein the process proceeds back to 518 to log the re-entered value.

Proceeding back to the determination at 528, and if the user does cancel the previously entered value, the process proceeds to verify a signoff for a first user at 538. At 542, a determination is made as to whether or not the verification succeeded. If not, the process logs a verification failure at 544 and proceeds back to receive new signoff data. If the verification is a success at 542, the process proceeds to 548 to log that a successful signoff has occurred. At 550, a determination is made as to whether another signoff is required. If not, the process proceeds to 552, clears the request for the signature and logs successful signature completion. If another signoff is required, the process proceeds to the acts represented at 554 to request signature verification from a subsequent user. These acts are similar to the acts represented at 524, 528, 538, 548, 542, and 544. As can be appreciated, signoffs for a given signature requirement can occur with more than two users. After execution of the clear signature request at 552, a determination is made as to whether or not there are more reports to verify at 560. If not, the process ends at 516 and continues with step verification depicted at FIG. 6. If more reports are left to verify at 560, the process proceeds back to 518 to log another report having associated values.

Referring to FIG. 6, a process 600 illustrates a manual phase step verification process that can occur after the process depicted in FIG. 5. If a step verification signature is required, and is cancelled, the step and any report verification signatures previously completed are re-executed as illustrated in FIG. 5. Proceeding to 612 of FIG. 6, a manual phase step has been previously completed having corresponding report verification signatures completed as described in FIG. 5. At 614, if a step verification signature is not required, the process ends at 616 where reports are uploaded for storage and the process can move on to the next process step or act if necessary. If a step verification signature is required at 614, the process proceeds to 618 where a step verification procedure is generated by a batch server or centralized processor(s). At 620, a user enters signoff data for the step verification. At 622, a determination is made as to whether or not a user desires to cancel the step verification. If so, the process proceeds to 624 where the signature cancellation is logged. At 628, the process 600 then proceeds back to the previous process depicted in FIG. 5 in order to re-complete the step.

Proceeding back to the determination at 622, and if the user does not decide to cancel the previously entered value, the process proceeds to verify a signoff for a first user at 632. At 634, a determination is made as to whether or not the step verification succeeded. If not, the process logs a verification failure at 638 and proceeds back to receive new signoff data. If the verification is a success at 634, the process proceeds to 640 to log that a successful signoff has occurred. At 642, a determination is made as to whether one or more signoffs is required. If not, the process proceeds to 644, clears the request for the signature and logs successful signature completion. If another signoff is required, the process proceeds to the acts represented at 646 to request signature verification from a subsequent user. These acts are similar to the acts represented at 620, 622, 632, 634, 638, and 640. As can be appreciated, signoffs for a given signature step requirement can occur with more than two users.

Before proceeding with a discussion of FIGS. 7-12, it is noted that example user interfaces are shown that can include various display and input capabilities. Thus, the user interface can be implemented as a Graphical User Interface (GUI) or interface application to interact with the systems previously described. This can include substantially any type of application that sends, retrieves, processes, and/or manipulates the various signature data and processes described herein. For example, such user interfaces can also be associated with an engine, controller, batch processor, web service, web site, and web browser although other type applications can be utilized. For example, depending on the detected recipe phase, the user interface may be converted from a normal operating interface to a guided sequence of instructions. This may be especially beneficial when all or portions of the recipe have changed and/or new procedures are to be installed. It is also noted that the user interface can be adapted to direct the operator to remote locations for respective information. For example, the interfaces can include hyperlinks for directing the operator to a remote web site, wherein further instructions are provided (e.g., mouse click at user interface automatically brings up web site).

The user interface can also include a display having one or more display objects including such aspects as configurable icons, buttons, sliders, input boxes, selection options, menus, tabs and so forth having multiple configurable dimensions, shapes, colors, text, data and sounds to facilitate operations with the systems and processes described herein. In addition, the user interface can also include a plurality of other inputs or controls for adjusting and configuring one or more aspects of the subject invention. This can include receiving user commands from a mouse, keyboard, speech input, web site, remote web service and/or other device such as a camera or video input, biometric device to affect or modify operations of the user interface.

Figure 7:
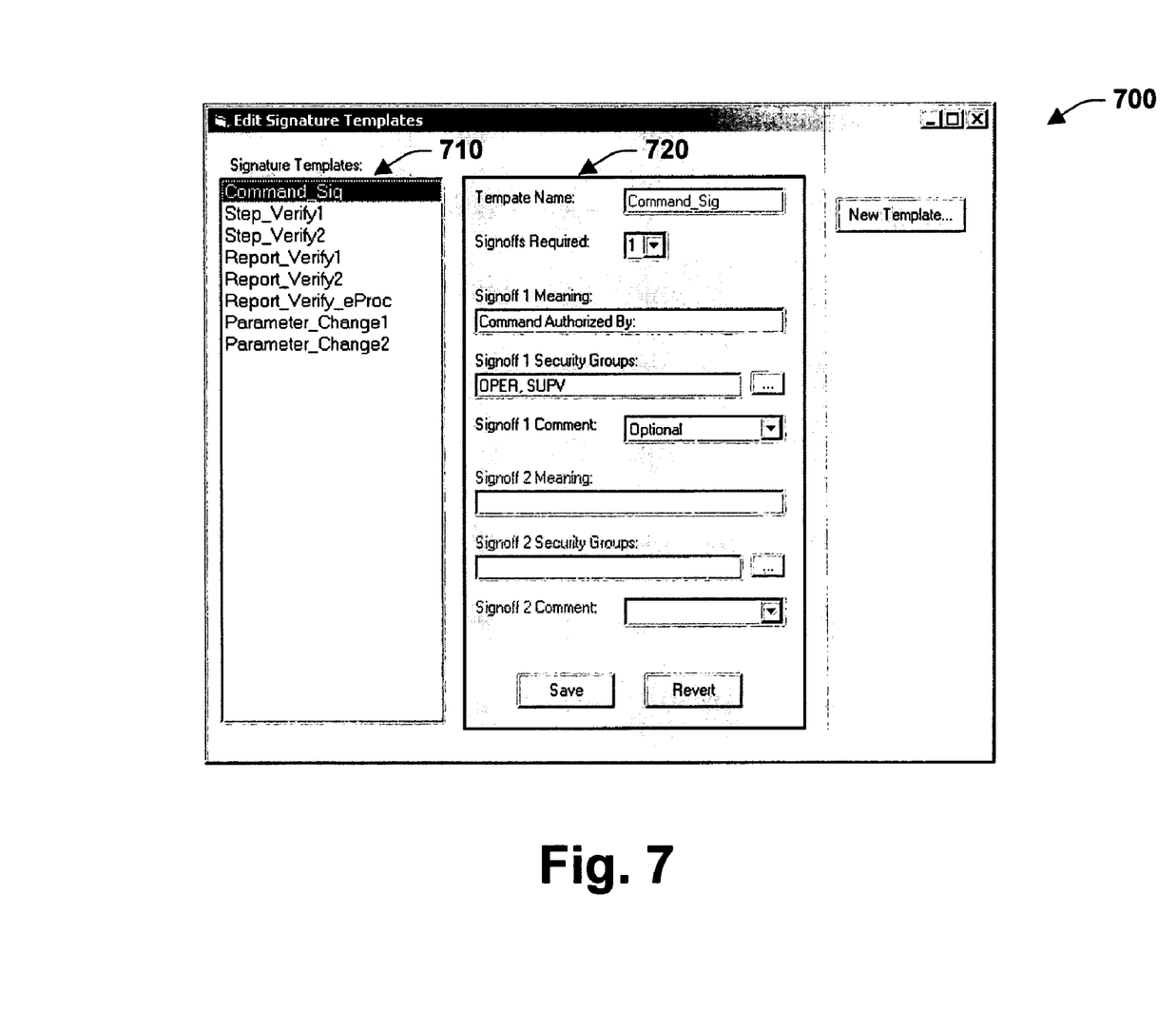
FIGS. 7-12 illustrate example user interfaces for distributed signature processing in accordance with an aspect of the subject invention.

Turning to FIG. 7, an interface 700 illustrates an example signature template in accordance with an aspect of the subject invention. Signature templates 700 can be defined centrally as part of an area model which describes an object for how program elements interact with equipment. Generally, signature components are defined for each signature template including one or more signoffs, signoff meanings, signoff security requirements, and signoff comment requirements. When a signature is used, the signature requirements should be defined by giving the name of one of the signature templates defined in the signature template editor 700. As illustrated, the signature template editor 700 shows different user defined template structures at 710. An input area 720 allows users to select/define a template name, define signoff meanings, define security groups, define whether comments are optional or required, and define similar requirements for additional users if more than one signature is required.

Figure 8:
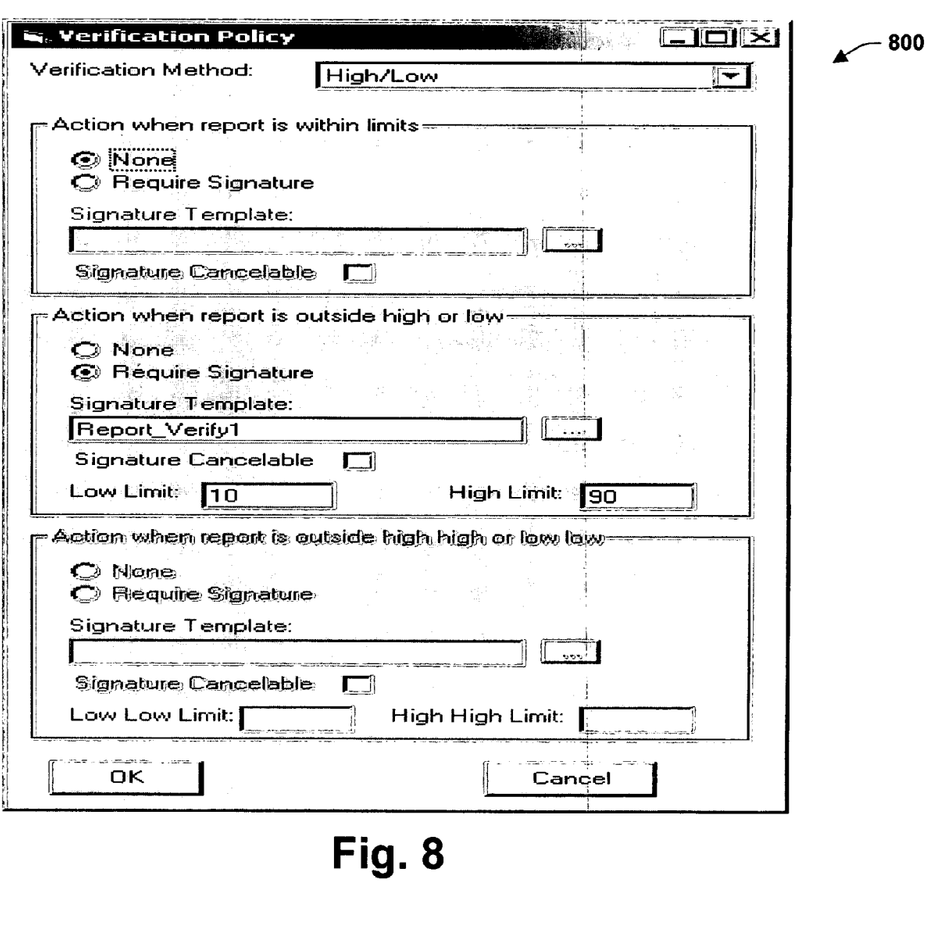

FIG. 8 illustrates an example interface 800 to configure a report verification policy. To configure a report verification policy, the user accesses a Reports tab (not shown) of an Edit Phase dialog (not shown) for the phase class in question. The user will then edit the report verification policy for a specific report, and be presented a dialog as shown at 800. The interface 800 includes inputs for entering a verification method (e.g., will the parameter be just a high and low limit, or high high, high, low, and low low limits), inputs for selecting whether a signature is required when within a limit or outside a specified limit, inputs for selecting a signature template, inputs for making a signature cancelable, and inputs for defining high and low limits.

Figure 9:
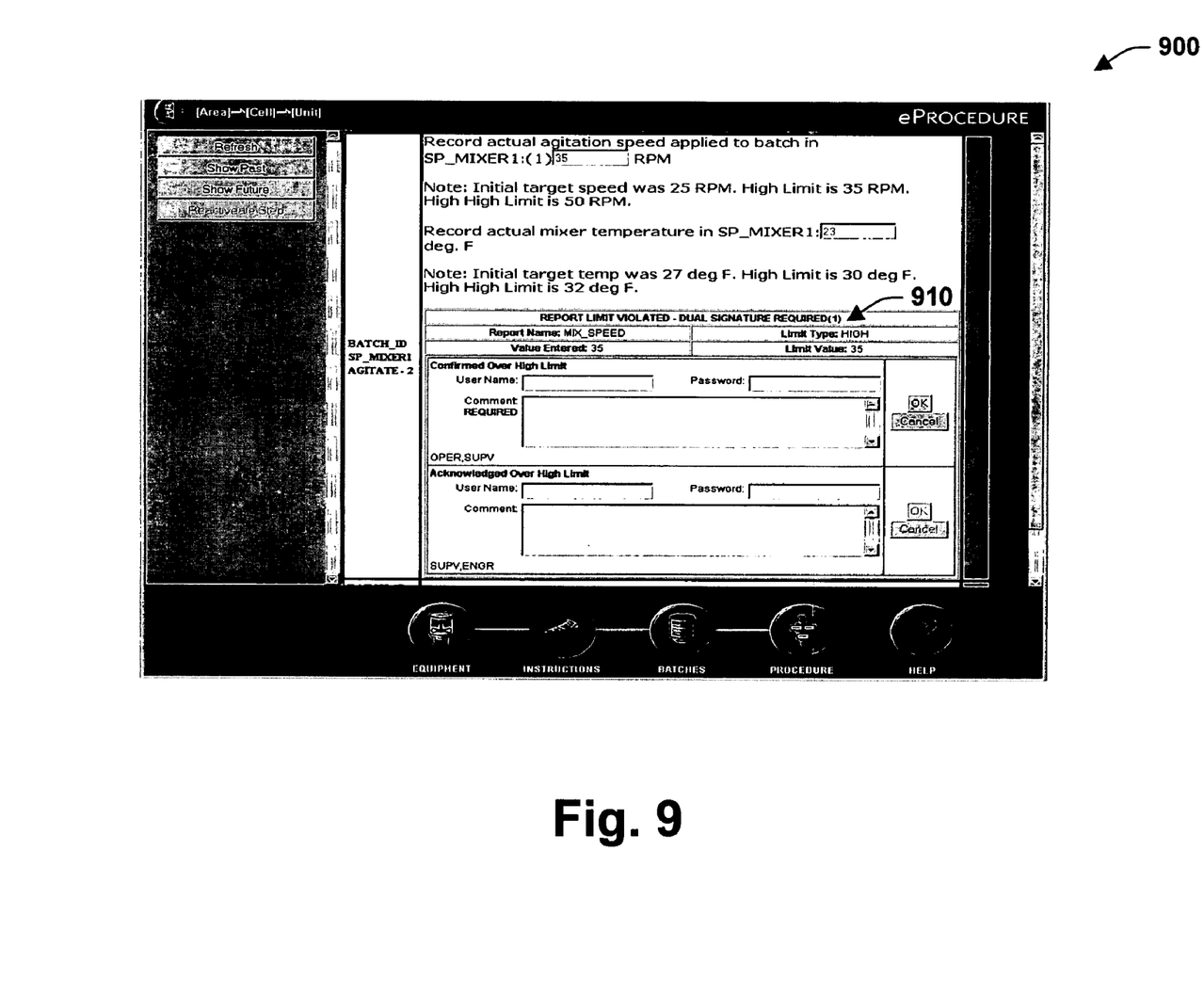
Figure 10:
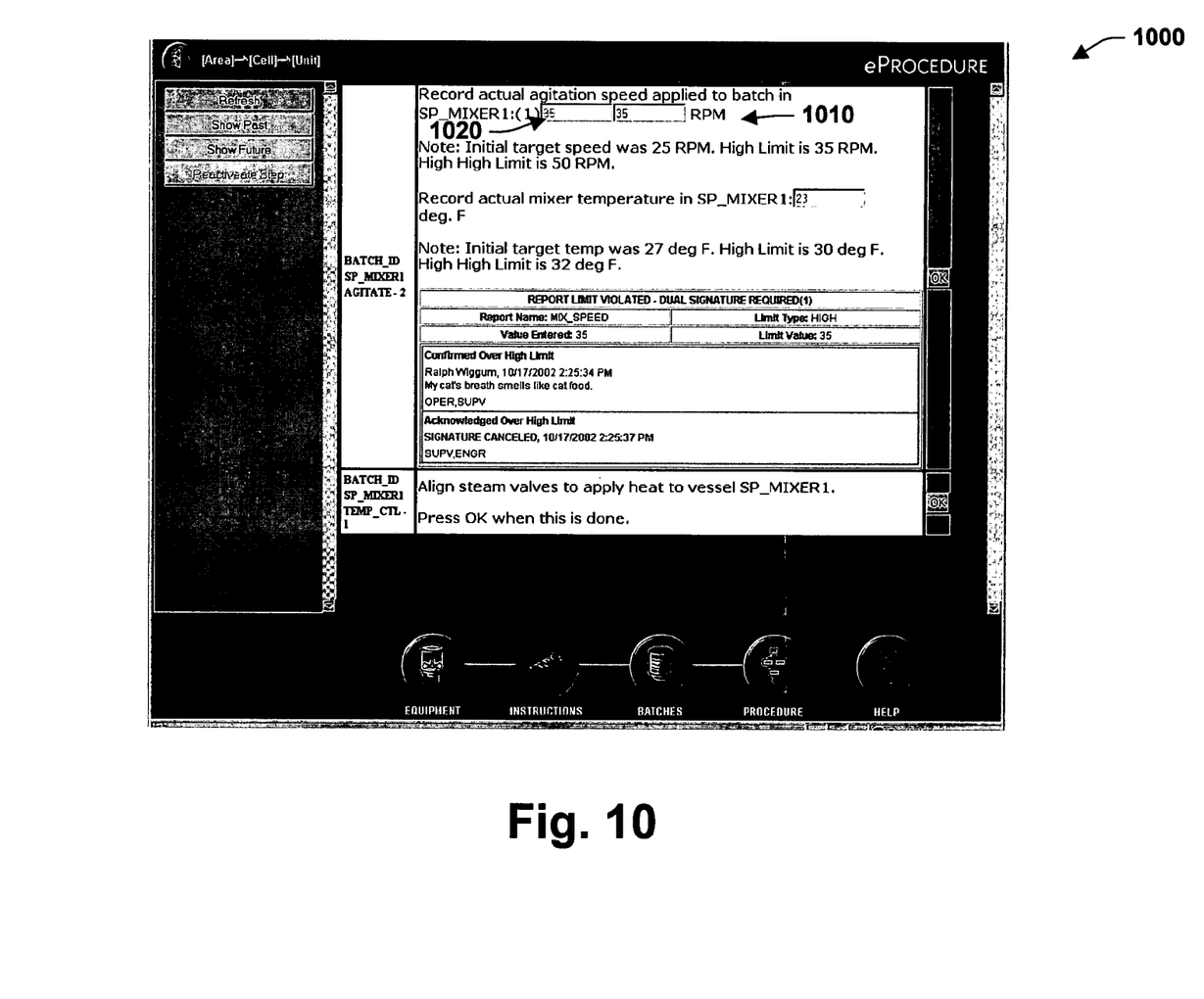

FIGS. 9 and 10 illustrate example interfaces 900 and 1000 that show execution of a dual signature. The interface 900 shows a location 910 for entry of a dual signature for manual phase report verification. The execution of a signature for a manual phase step verification is similar. The interface 1000 shows where the second signoff of the dual signature has been canceled. Note that previously entered signature data is visible at 1010 and the text box associated with the signature is active, whereas the text box for which a signature was not required is not active, and the OK button is present. Note also that the original value is struck out at 1020 in a box next to the active text box.

Figure 11:
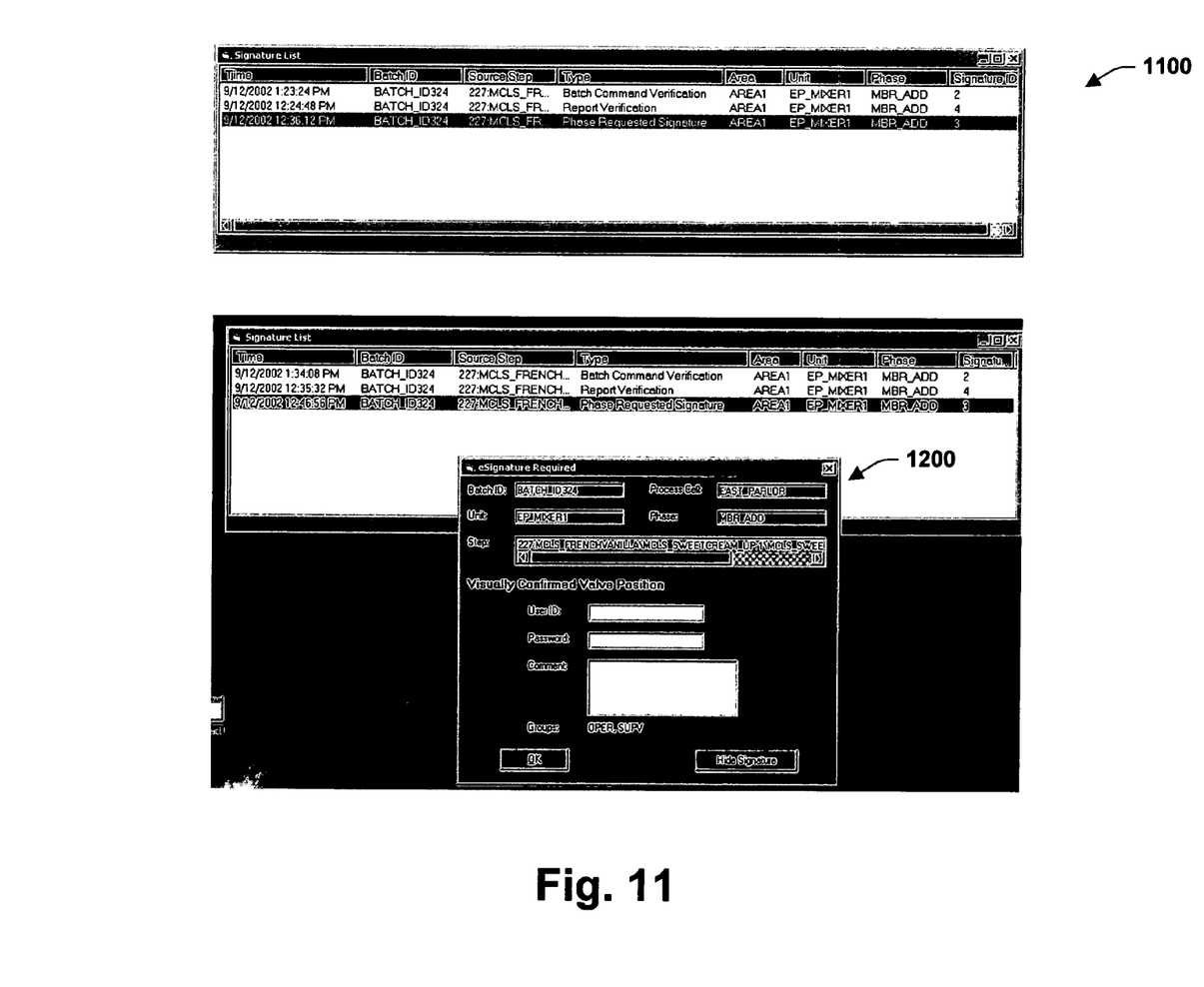
Figure 12:
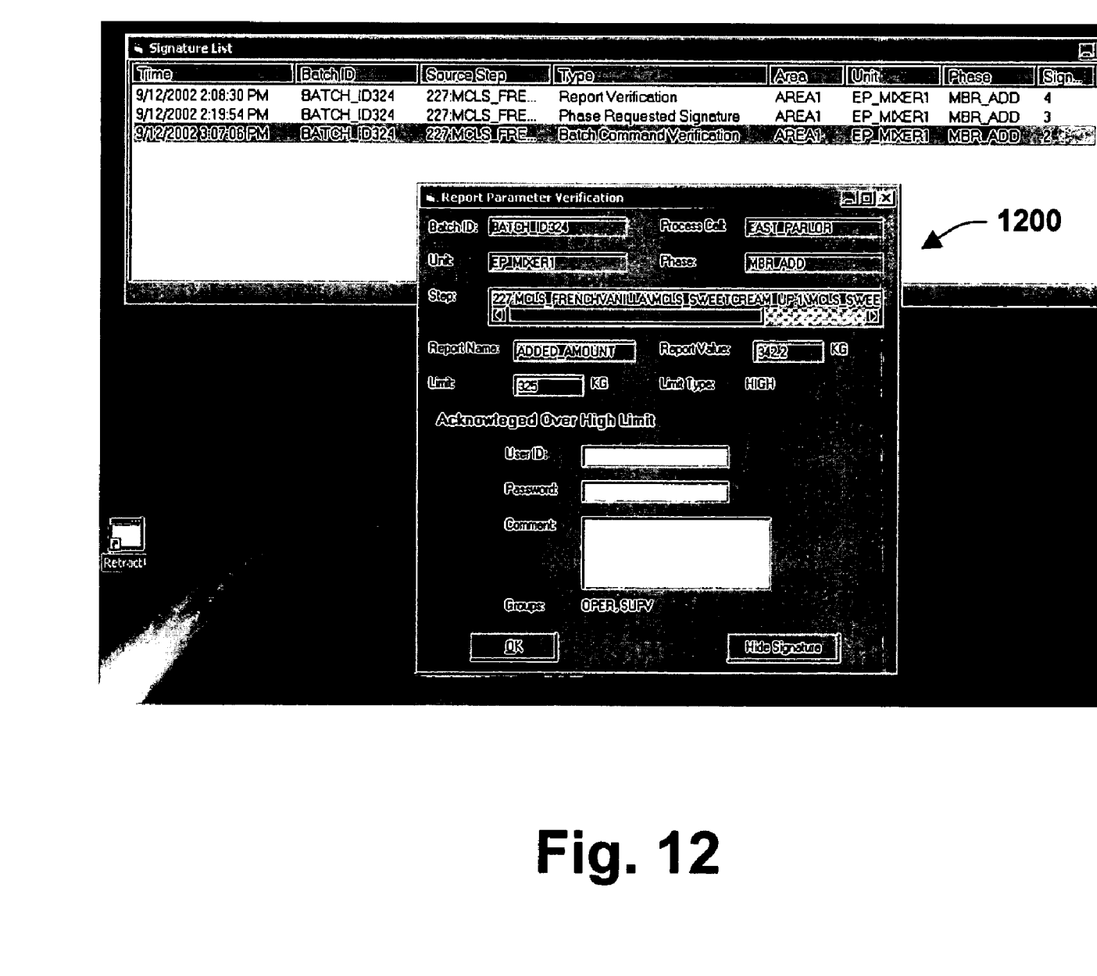

FIG. 11 illustrates a signature list ActiveX control at 1100. Automated phase report verification signatures, general usage signatures, batch command signatures, and recipe parameter verification signatures are accessible from the Signature List in a View or an ActiveX control. In the screen shot 1100, a general usage signature has been selected. A general usage signature is generated when requested by a process control device. When the user selects that signature from either the ActiveX control, he will be presented with a signature dialog to complete as illustrated at 1110 (e.g., visually confirmed valve position). The sender of the request can specify whether the signature should be cancelable or not. In the example in the interface 1200 of FIG. 12, a report verification signature for an automated phase is shown. As such, the signature is not cancelable.

What have been described above are preferred aspects of the subject invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A non-transitory computer-readable storage medium having computer-readable instructions stored thereon that execute a system for distributed signature processing comprising:
   a signature component configured to receive at least one command from a batch server executing a recipe in response to detection of an automated non-operator initiated recipe step having an electronic signature requirement, the at least one command causing the signature component to generate an electronic signature event;
   an application layer configured to notify at least one interface component of the electronic signature requirement in response to the electronic signature event, and to receive the electronic signature from the at least one interface component, the signature component further configured to verify the electronic signature fulfils the electronic signature requirement; and
   a user interface that displays pending signatures, wherein selection of a selected pending signature from the user interface causes a signature dialog for entry of signature data for the selected pending signature to be displayed.

2. The computer-readable storage medium of claim 1, further comprising one or more distributed client applications interacting with the signature component through the application layer, the one or more distributed client applications configured to send user identification and password data to the signature component to be validated.

3. The computer-readable storage medium of claim 1, the at least one interface component operates on a local or remote computer and interfaces with the signature component via a wireless or wired network.

4. The computer-readable storage medium of claim 1, wherein the application layer includes at least one of a schema, an interface template, a dialog option, a signature control, an input for receiving signatures, an Active X control, or a display output to drive signature procedures and graphical user interfaces components.

5. The computer-readable storage medium of claim 1, the signature component is associated with at least one of the batch server or an industrial controller.

6. The computer-readable storage medium of claim 1, the signature component links a record of the electronic signature with the automated manufacturing process recipe step.

7. The computer-readable storage medium of claim 1, the signature component generates the signature event in response to automated phase logic uploading a value that is outside of a defined range.

8. The computer-readable storage medium of claim 1, the electronic signature is associated with one or more signoffs, each signoff including a user identifier (*ID) and password field.

9. The computer-readable storage medium of claim 8, each of the one or more signoffs has an associated comment field configured as one of required, optional, or not allowed.

10. The computer-readable storage medium of claim 8, each of the one or more signoffs is associated with a meaning or one or more security requirements.

11. The computer-readable storage medium of claim 1, the electronic signature requirement is associated with at least one of a report verification for an automated phase or a manual phase, a general usage requirement of an automated phase, a manual phase step verification, a command initiated by an operator, a parameter change initiated by an operator, or a recipe step.

12. The computer-readable storage medium of claim 1, further comprising a journal component that logs cancelled and completed signature interactions.

13. The computer-readable storage medium of claim 1, wherein the electronic signature is required to be signed off from at least two separate workstations.

14. The computer-readable storage medium of claim 1, further comprising a verification component that determines whether a changed value requires signature verification.

15. The computer-readable storage medium of claim 14, the verification component includes at least one of a policy, a rule, or a limit to perform the verification.

16. The computer-readable storage medium of claim 11, wherein users are prevented from cancelling the signature event generated in response to the at least one command from the batch server, and are permitted to cancel the manual phase signature requirement.

17. The computer-readable storage medium of claim 16, wherein cancellation of a signature is logged.

18. A method for processing electronic signatures associated with an automated manufacturing process, comprising:

Detecting execution of an automated non-operator initiated recipe step having an electronic signature requirement;

notifying at least one interface component of the electronic signature requirement in response to the detecting;

receiving an electronic signature input from the at least one interface component;

verifying that the received electronic signature fulfils fulfills the electronic signature requirement;

displaying a list of pending electronic signatures for the automated manufacturing process on a signature list user interface; and displaying a signature dialog upon selection of a selected pending electronic signature from the list of pending electronic signatures, the signature dialog allowing entry of signature data for the selected pending electronic signature.

19. The method of claim 18, further comprising:

receiving a request to change a parameter relating to the automated manufacturing process form a first value to a second value;

determining whether the request requires signature verification based on at least one of a policy determination or a limit test on the second value; and initiation a signature verification procedure if it is determined that the request requires signature verification.

20. The method of claim 18, further comprising linking a record of the electronic signature with the recipe step.

21. The computer-readable storage medium of claim 15, further comprising a verification policy configuration interface employed to configure the report verification component, the interface accepting at least a first input specifying a verification method, a second input specifying whether the electronic signature is required when within a limit or outside a limit, and a third input selecting a signature template.

* * * * *